UNITED STATES PATENT OFFICE.

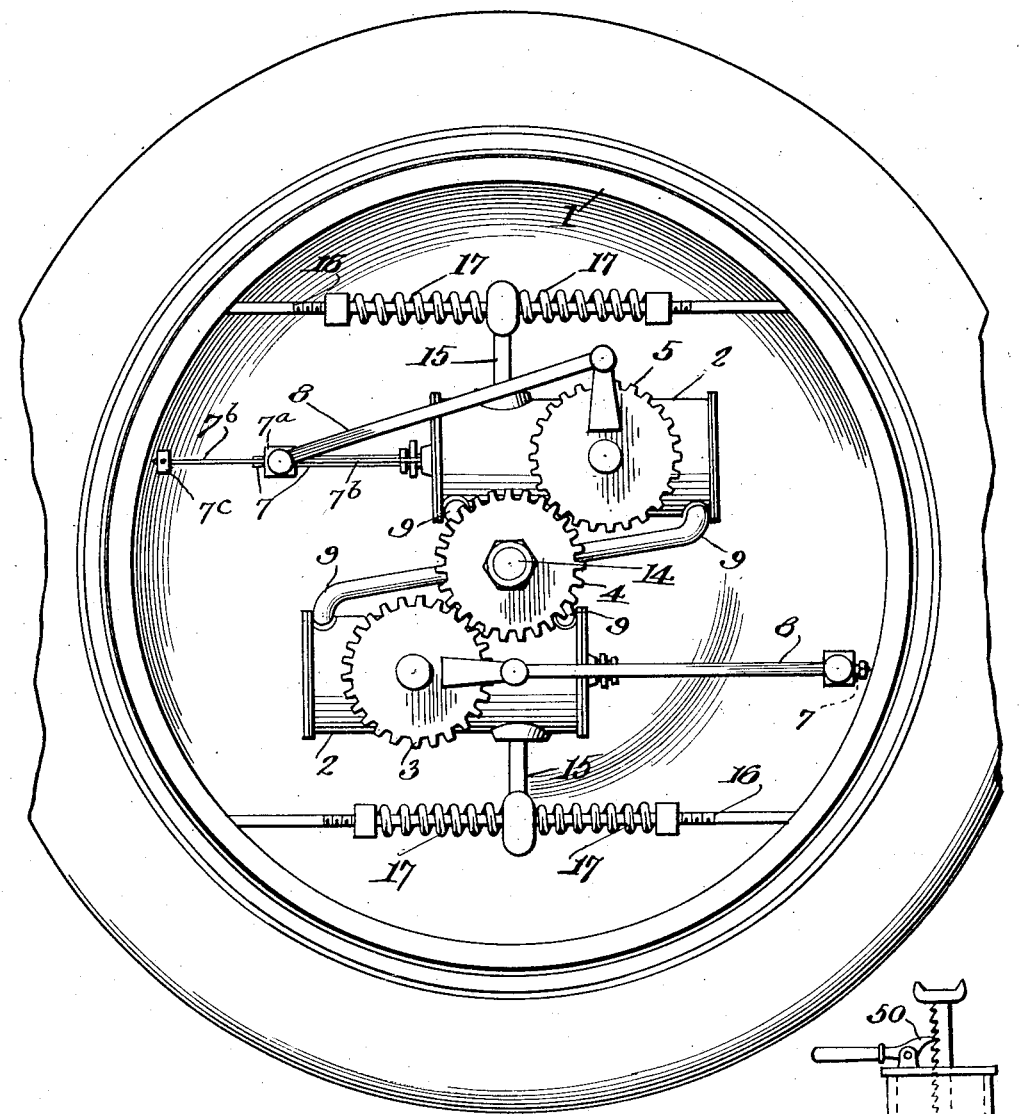

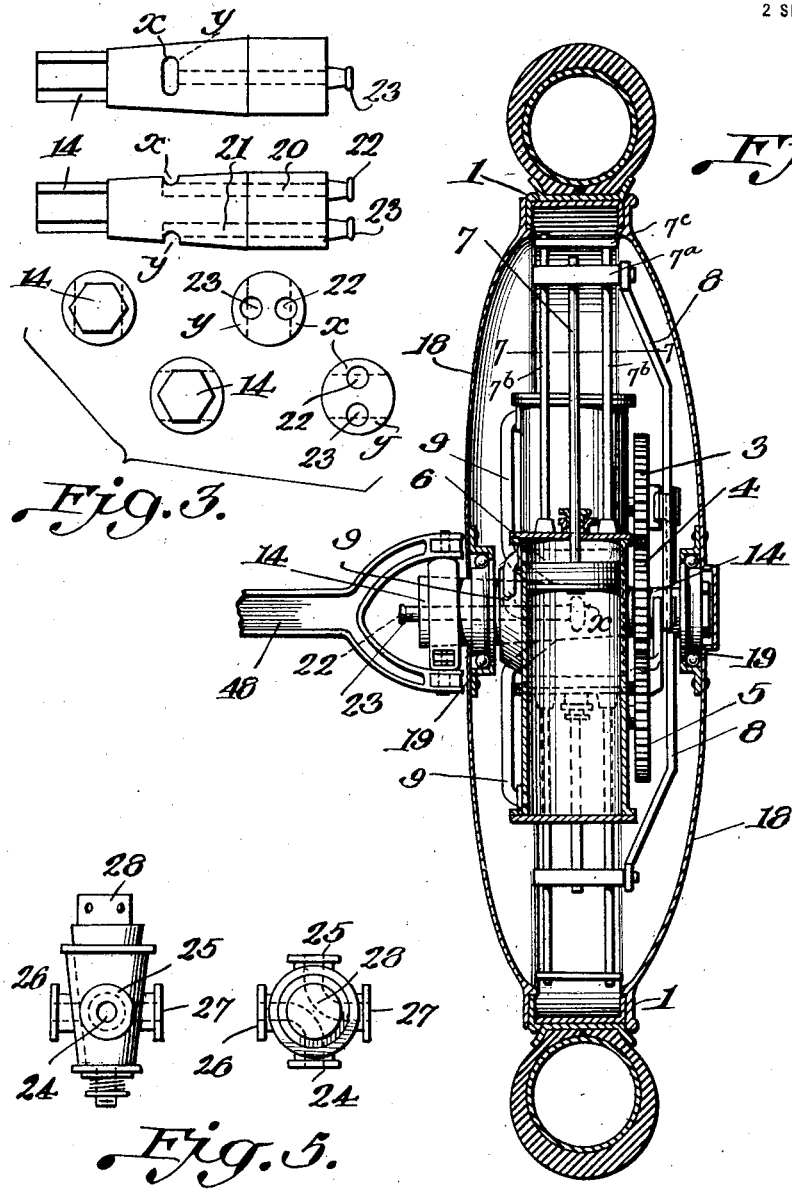

GEORGE C. ALSTAD, OF CHICAGO, ILLINOIS.

COMPRESSED-AIR POWER-DRIVE.

1,349,036.  Specification of Letters Patent. Patented Aug. 10, 1920.

Application filed June 1, 1918. Serial No. 237,791.

*To all whom it may concern:*

Be it known that I, GEORGE C. ALSTAD, a resident of the city of Chicago, State of Illinois, have invented certain new and useful Improvements in Compressed-Air Power-Drives, of which the following is the specification.

My invention relates to an improved form of power drive for motor vehicles in which motors are mounted in the wheels of the vehicle and provided with fluid under pressure through suitable devices so that the said motors may be operated by the fluid pressure. The fluid employed is preferably gas of one kind or another, as for example, air, supplied from tanks located upon the vehicle for containing the gas under pressure, which tanks may either be of a capacity to contain sufficient of the compressed gas to operate the motors for a desired interval, after which the tank may be recharged from any suitable source, or the vehicle may be equipped with an engine of any desired form and a compressor for maintaining the tank in charged condition in which event devices controlled by the pressure in the tank may be employed for starting and stopping the engine as required to maintain the pressure in the tank practically constant.

By my invention I also provide for inflating the tires of the vehicle, when said tires are of the pneumatic variety, from said storage tank and for operating any other desired pneumatic devices such for example as pneumatic jacks.

By my invention I also provide an improved means for steering all four wheels of the vehicle either simultaneously or other desired relation to each other, that is to say, turning the front wheels in one direction and the rear wheels in the same direction or turning the front wheels in one direction and the rear wheels in the opposite direction as desired, or for steering either the front or rear wheels independently.

By my improved driving mechanism it will be observed that I eliminate shift gears, friction drives, transmission gearing of all kinds, intermediate shafts and clutches, and thus utilize the power of the compressed fluid to great advantage since the motors in the wheels communicate the driving effort directly to the wheels and at any desired speed determined by controlling devices employed to regulate the amount of fluid supplied to the motors as well as the direction of rotation of the motors, which regulating devices are preferably operated from the steering column of the vehicle.

It will be understood that while I have shown my invention as applied to a road vehicle of the motor type that I do not limit myself to the use of my improved power drive in such connections as it is equally applicable to any motor driven device in which the motor or motors can be mounted on the driving member of the vehicle and controlled in substantially the manner described below. For example, it is equally applicable to flying machines of different types.

My invention will best be understood by reference to the accompanying drawings showing a preferred embodiment thereof in which—

Figure 1 shows one of the wheels of a motor vehicle equipped with my power drive in side elevation, one of the inclosing plates of the wheel being removed to more clearly show the mechanism contained within the wheel, Fig. 2 is a vertical section taken transversely through the parts shown in Fig. 1 and shows a portion of the axle connected with the wheel, Fig. 3 is a detail view showing the parts employed to communicate the compressed fluid through nonrotating parts connected with the axle shown in Fig. 2, to the motor mechanism carried by the wheel, Fig. 4 is a detailed view of a cutoff box carried by the wheel and coöperating with the devices shown in Fig. 3 to connect the piping of the motor mechanism of the wheel with the supply and exhaust passages of the devices shown in Fig. 3 at proper intervals to operate the motor mechanism, Fig. 5 shows in side elevation and top view a form of valve mechanism for regulating the speed and direction of operation of the motor mechanism of the wheel, and Fig. 6 is a diagrammatic view of a pneumatic jack adapted to be used in connection with my invention, and Fig. 7 is a cross section taken substantially along the plane indicated by the line 7—7, Fig. 2.

Similar numerals refer to similar parts throughout the several views.

As shown in Figs. 1 and 2 the wheel 1 is of the disk variety having inclosing disk plates 18 which support ball or roller bearings 19 for supporting the axle 14 from the wheel. In Fig. 1 the front plate 18 is removed. The wheel carries two motor cylinders 2—2 upon opposite sides of the axle 14 which cylinders lie in the plane of the wheel and are supported by means of brackets 15 rigidly secured to the cylinders and projecting radially therefrom to engage the supporting rods 16 rigidly secured to the rim of the wheel. The rods 16 are provided with springs 17 surrounding them on either side of the brackets 15 which springs engage at their other end retaining nuts threaded on the rods 16 as a result of which the brackets 15 may slide somewhat longitudinally on the rods by correspondingly compressing the springs 17 which springs may be given any desired initial compression by the retaining nuts.

Each of the cylinders 2 is provided with a piston 6 of usual construction connected with a piston rod 7 which in turn is pivotally connected with a connecting rod 8, the other end of which is pivotally connected with a crank carried by gear 5 for the upper cylinder shown in Fig. 2 and gear 3 for the lower cylinder, these gears being rotatably mounted upon studs projecting from the corresponding cylinders and located so that said gears mesh with opposite sides of a gear 4 rigidly secured to the end of the axle 14.

Piston rod 7 is connected to a cross head 7$^a$ to which connecting rod 8 is secured. Cross head 7$^a$ slides on a pair of rods 7$^b$, secured at one end to the cylinder and at their opposite end connected by a cross-bar. It will therefore be seen that the piston rod 7 is guided in its reciprocating motion by the cross-bar 7$^a$ sliding on rod 7$^b$.

As a result of the construction described when the piston rods 7 are operated by supplying fluid under pressure to the cylinders 2 in a manner to be described, the gears 3 and 5 are rotated in one direction or the other and thus exert a turning moment upon the wheel due to the action of the gears 3 and 5 upon the gear 4 and as a result the cylinders 2 and therefore the wheel 1 is rotated. The springs 17 prevent abrupt shocks being communicated either to the wheel by a change in the amount of driving effort exerted, or communicating shock to the motor mechanism from the wheel resulting from inequalities in the road bed.

The stationary axle 48 is forked at its end and carries vertical pivots for engaging the inner end of the axle 14 which is thus non-rotatably supported to turn on said pivots. The axle 14 is tapered at its mid portion as shown in Fig. 3 and is provided with opposite ports X and Y communicating with passages 20 and 21 terminating at the inner end of said axle in couplings 22 and 23 for connection by flexible tubing not shown, with the ports 26 and 27 respectively of the regulating valve shown in Fig. 5.

The wheel carries a cut-off box shown in Fig. 4 between the cylinders 2—2, opposite recesses being formed in the outer surface of said box as indicated to clear said cylinders, and said box has a tapered bore which is a sliding fit on the tapered portion of the axle 14. The cut-off box has inclined passages formed therethrough, the inner ends of which are in the plane of the ports X and Y and the outer ends of which are connected by pipes 9—9 with both ends of the cylinders 2—2, which cylinders are of the double acting type. The cranks on the gears 3 and 5 are preferably displaced angularly from each other so there will be no position of dead center for the motors as a whole, but that on the other hand the wheel will turn in either direction under the action of the fluid pressure for any initial position of the wheel, depending upon the position given the regulating valve 28. The ports X and Y and the inner ends of the passages 10, 11, 12 and 13 are angularly related so that the fluid pressure is communicated from one of the ports X and Y to each of the cylinders 2 through one of its pipes 9—9 through a desired part of its power stroke, the pipe 9 at the other end of said cylinder being at the same time connected with the other port X or Y as the case may be. By operation of the valve 28 either of the ports X and Y may be made the supply port and the other the exhaust port and thus the motors may be operated in either direction desired.

The casing of the valve 28 shown in Fig. 5, has in addition to the ports 26 and 27, ports 24 and 25 for connection respectively with the storage tank and the exhaust pipe, and the valve 28 has two passageways formed therein, for connecting the ports 24 and 25 either with the ports 26 and 27 or 27 and 26 respectively as desired, thus providing for making the ports X and Y either supply and exhaust ports or exhaust and supply ports respectively as desired. The relation of the ports and passages is such that the valve 28 may be given an intermediate position entirely interrupting communication between the port 24 and the other ports of the valve casing, which is the position of the valve for stopping the motors.

It will at once appear that the valve 28 provides a means for establishing any desired degree of communication between the port 24 and either of the ports 26 and 27, thus making the valve 28 a combined throttle valve for either direction of operation of the motors and reversing valve.

The outer end of the axle 14 is preferably provided with a flattened shank which may conveniently be octagonal, or hexagonal to rigidly support the gear 4.

The pneumatic jack shown in Fig. 6 is adapted to be conveniently operated by air pressure from the storage tank through a suitable flexible tube connection, and may be held in operated position by a latch 50. A relief valve 52 is provided to discharge the air from the cylinder of the jack when the weight previously lifted is to be lowered.

While I have shown my invention in the particular embodiment above described I do not however limit myself to this particular construction as I may employ any equivalents thereof known to the art at the time of the filing of this application without departing from the scope of the appended claims.

What I claim is:

1. In a fluid driving mechanism, the combination of a wheel, a motor cylinder carried by the wheel, a stationary axle, gearing between said axle and cylinder for rotating said wheel and cylinder by fluid pressure in said cylinder, and a resilient connection between said cylinder and wheel.

2. In a fluid driving mechanism, the combination of a wheel, motor cylinders carried by the wheel, a stationary axle, gearing between said axle and cylinders for rotating said wheel and cylinders by fluid pressure in said cylinder, means for supplying fluid under pressure through said axle to said cylinders, and spring connections between said cylinders and said wheel.

3. In a fluid driving mechanism, the combination of a wheel, a stationary axle, two substantially parallel cylinders carried by the wheel on opposite sides of said axle, piston rods, connecting rods and cranks carried by the wheel and operated by fluid pressure in said cylinders, a gear rigidly secured to said axle, gearing between said cranks and said gear, and springs between said cylinder supports and said wheel for cushioning the strains between said cylinders and wheel.

4. In a fluid driving mechanism, the combination of two members comprising an axle and a wheel mounted to rotate around said axle, an engine element for receiving fluid under pressure, a train of mechanism supporting said element from one of said members and connecting with the other of said members, whereby fluid pressure in said element produces a torque between said members tending to turn said wheel in one direction and tending to turn said axle in the reverse direction, and a resilient member in said train of mechanism for cushioning the strains between the wheel and axle.

5. In a fluid driving mechanism, the combination of two members comprising an axle and a wheel mounted to rotate around said axle, an engine element for receiving fluid under pressure, a train of mechanism supporting said element from one of said members and connecting with the other of said members, whereby fluid pressure in said element produces a torque between said members tending to turn said wheel in one direction and tending to turn said axle in the reverse direction, a spring in said train of mechanism between said engine element and the member supporting it for cushioning the strains between the wheel and axle, and devices for changing the pressure initially exerted on said spring as desired.

6. In a fluid driving mechanism, the combination of two elements comprising a wheel and axle, cylinders, piston rods, connecting rods and cranks carried by one of said elements, a gear carried by the other of said elements, gearing between said cranks and said gear whereby fluid pressure in said cylinders produces a torque between said elements tending to turn said wheel in one direction and tending to turn said axle in the reverse direction, and springs in the driving trains between said elements for cushioning the strains produced by said cylinders.

7. In a mechanism of the class described, a rotatable member, a cylinder mounted upon the rotatable member to rotate therewith, a non-rotatable axle, driving connections between said axle and said cylinder for rotating the rotatable member and cylinder upon the introduction of pressure into the cylinder, the connection between the cylinder and the rotatable member being resilient to cushion the strains between the cylinder and rotatable member.

8. In a mechanism of the character described, a rotatable member, a cylinder carried by the rotatable member to rotate therewith, a non-rotatable axle, driving connections between said axle and said cylinder for rotating the rotatable member and cylinder upon the introduction of pressure into the cylinder, means for regulating the fluid pressure in the cylinder, and means for resiliently connecting the cylinder to the rotatable member.

In testimony whereof I have signed this specification in the presence of two subscribing witnesses.

GEORGE C. ALSTAD.

Witnesses:
 KNUTE I. FINNEY,
 HAROLD NILSEN.